Patented June 17, 1924.

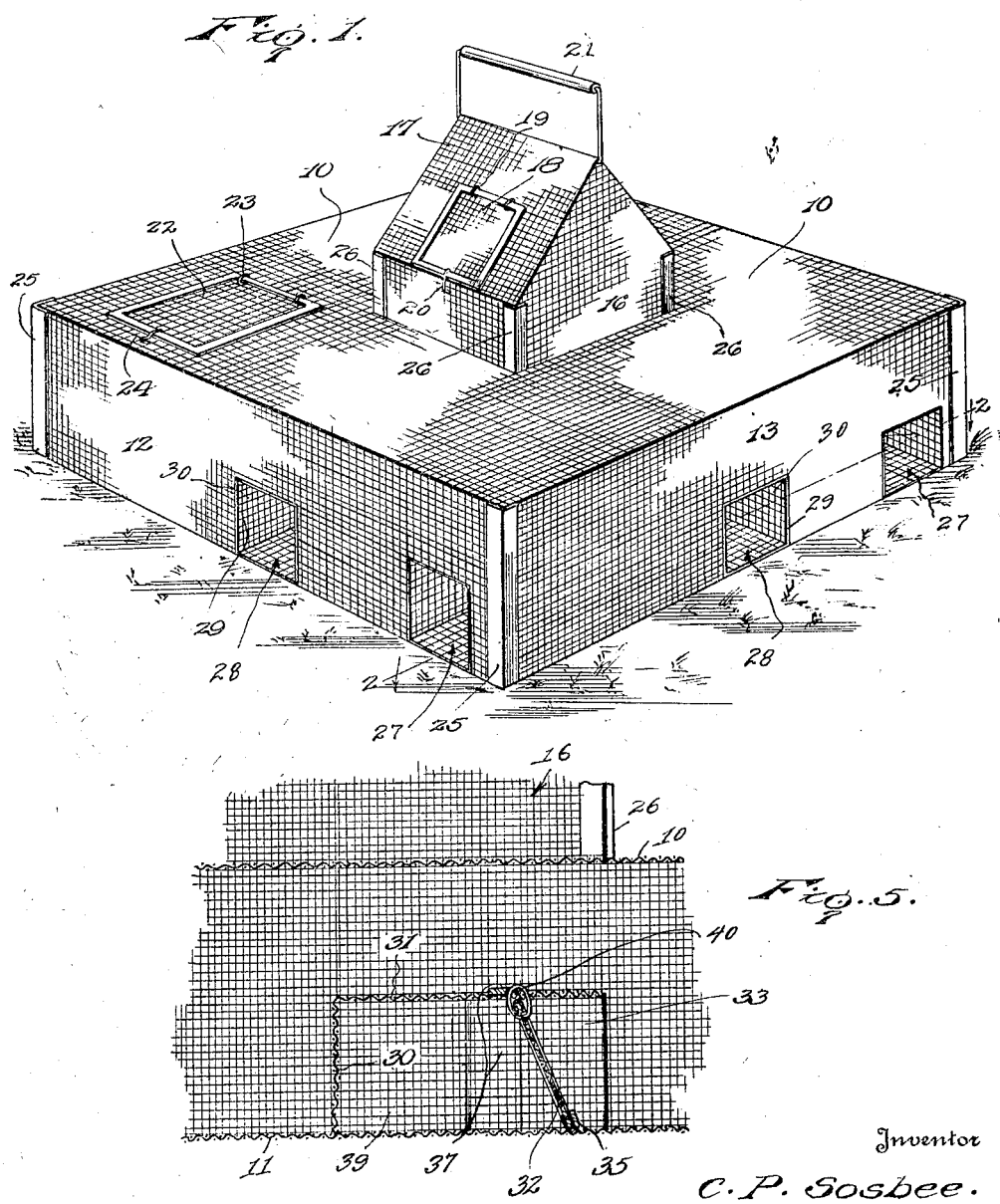

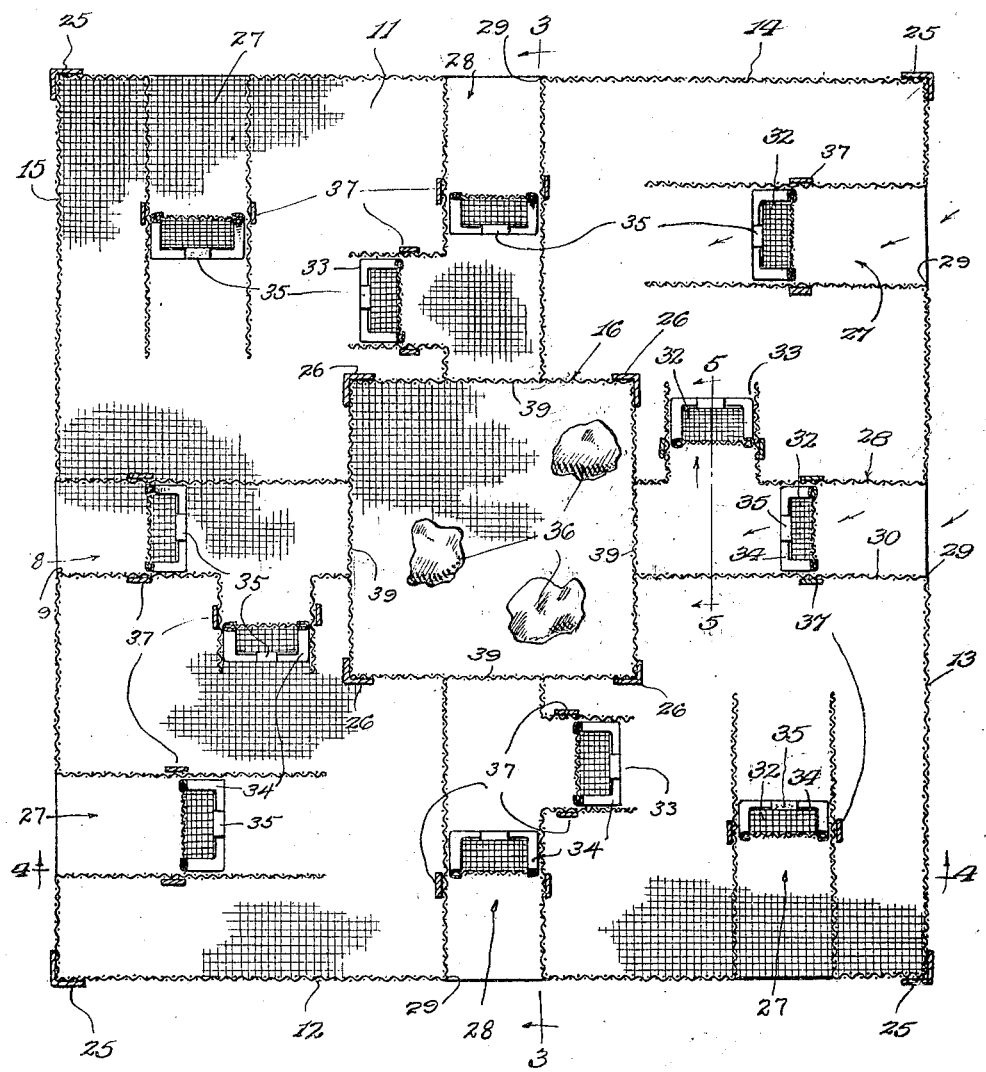

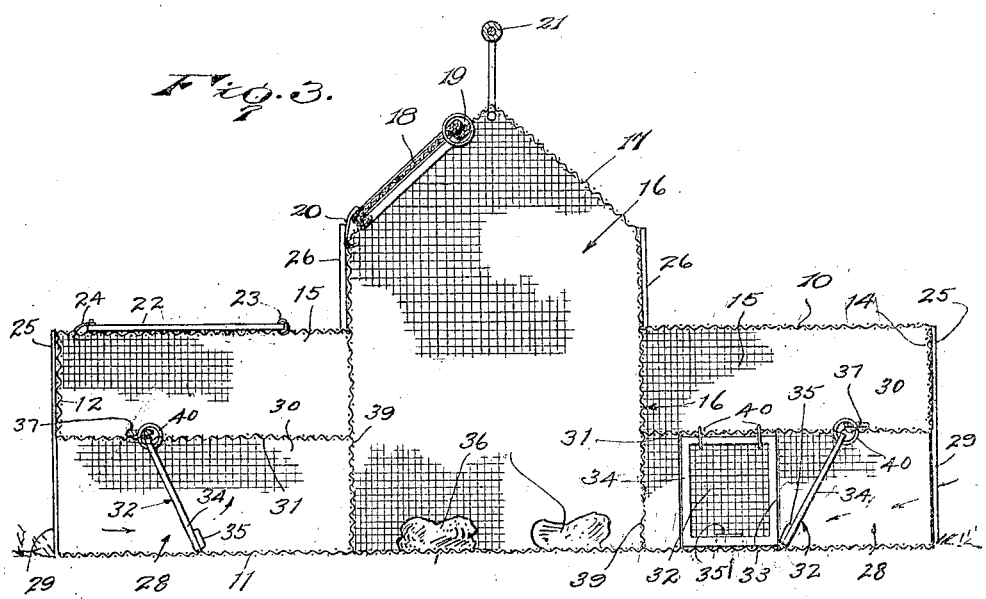
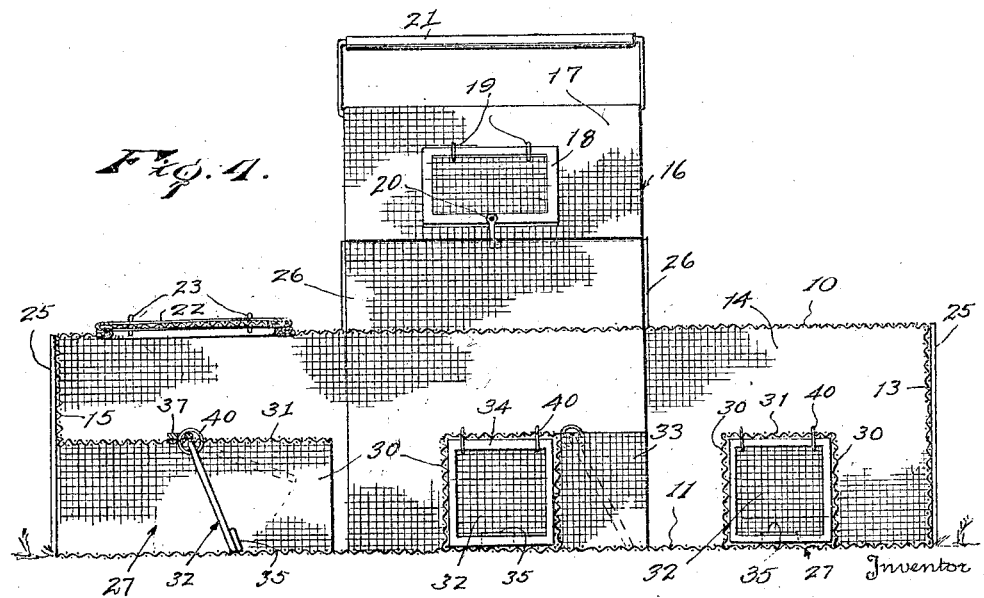

1,497,883

UNITED STATES PATENT OFFICE.

CHARLES P. SOSBEE, OF SADIEVILLE, KENTUCKY, ASSIGNOR OF ONE-HALF TO W. A. McLONEY, OF CYNTHIANA, KENTUCKY.

ANIMAL TRAP.

Application filed November 21, 1922. Serial No. 602,393.

*To all whom it may concern:*

Be it known that I, CHARLES P. SOSBEE, a citizen of the United States, residing at Sadieville, in the county of Scott and State of Kentucky, have invented certain new and useful Improvements in Animal Traps, of which the following is a specification.

The present invention relates to a trap for catching small destructive animals, such as rabbits, rodents, minks or reed birds.

The main object of the invention is to provide a trap in the form of a cage, which requires no setting for catching animals and which will trap any number of them, as the bait is placed in such a position, that it will attract a number of the animals without being consumed.

Another object of the invention is to arrange entrances to the cage in such a manner that they will be opened by the animals when entering, but automatically closed directly an animal is inside of the cage.

Another object of the invention is to so construct the cage, that it may be inspected without opening the same and so that one or more of the animals may be removed therefrom while others remain entrapped therein.

From extensive tests of the trap it has proved itself to be very efficient, so that a great number of birds or four-footed animals have been caught at the same time.

In the accompanying drawings, one embodiment of the invention is illustrated, and Figure 1 shows a perspective view of the trap in position;

Figure 2 is a horizontal section along line 2—2 of Figure 1;

Figure 3 is a vertical section along line 3—3 of Figure 2;

Figure 4 is a vertical section along line 4—4 of Figure 2, and

Figure 5 is a fragmentary section along line 5—5 of Figure 2.

The trap is preferably constructed entirely from fine wire netting, which is painted black or some other suitable color. Other material may be used for the construction of the trap, as for instance, sheet metal; in such a case windows of transparent material should be furnished in different places, so that the bait can be seen by animals passing the trap and there should be sufficient openings for the scent of the bait to penetrate in all directions.

As seen in the accompanying drawings the trap is constructed like a cage having its top 10 and bottom 11 as well as the four sides 12, 13, 14 and 15 made of wire netting. In the center of the cage is provided a bait chamber with four side walls 16 secured to the bottom 11 and extending through a suitable opening in the top 10 of the cage, terminating with a slanting roof 17. A door 18, hinged as at 19, is provided on the slanting roof for depositing bait 36 inside this chamber. The door is held down by a suitable hook or latch 20. A handle 21 is secured at the top of the roof 17 for carrying the cage. The top 10 is also provided with a door 22 of the same construction as door 18, hinged as at 23 and latched as at 24 to the top. This second door is furnished for the purpose of removing the animals trapped in the cage.

All the corners of the cage and the bait chamber are suitably reinforced by short pieces of sheet metal 25 and 26. These angles are firmly connected with the wire netting, preferably by soldering.

Small cells or drums forming passages 27 and 28, which run at right angles from the side walls of the cage, some distance inwardly thereof, are provided. The passages 28 are situated in the middle of each side wall and each has a door opening 29 through the outer wall forming an entrance to the passage, which is preferably rectangular, consisting of two upright side 30 and a roof covering 31. The passages 28 extend across to the side wall of the bait chamber 16, while the passages 27, which are placed between the center passage 28 and one corner of a side wall, terminate substantially in alinement with that side wall of the bait chamber 16 which is nearest to and parallel to the outer side wall of the cage from which the passage runs, best seen in Figure 2 of the drawings.

Each of the center passages 28, which accordingly ends as a blind alley against the side wall of the bait chamber 16, has an outlet 33 to one side thereof, while the side passages 27 are unobstructed and open at their inner ends into the cage.

As the passages 27 and 28 are lower than the height of the cage itself, as clearly shown in Figures 3, 4, and 5 of the drawings, it will be evident that one large room is formed within the cage around the central or bait chamber 16, so that the animal entering through one of the passages 27 or 28 can run around the latter by jumping over the tops 31 of the passages. Accordingly the single door 22 is sufficient for emptying the cage, as all the trapped animals may be driven to that corner of the cage to be taken out.

Each of the passages 27 and 28 is provided with a swinging door or gate 32, which is hinged as at 40 in the roof covering 31, best seen in Figure 5.

Similar gates are also provided to the outlets 33. These gates 32 are also constructed of wire netting inserted in a surrounding frame 34, to which it is soldered. The height of these gates is greater than the height of the passages, so that they must always stand in inclined position, as seen in Figures 2, 3, 4, and 5. The gates are all arranged to open inwardly, so that the bottom edge of the gate is further in than the hinged portion thereof. The gates must work very easily on their hinges and in order to close automatically a small weight 35 of lead or any other heavy material may be attached to the bottom side of the frame 34. The lids 18 and 22 are of similar construction to the gates 32, that is to say, they are made of wire netting fastened in a frame.

The trap is used in the following manner:

After putting the bait, 36 intended to attract by its odor or appearance the animals to be trapped, into the bait chamber 16, the cage is placed in a position, where the animals are in the habit of passing. As the cage is painted in a color that will not frighten the animals, they will approach the cage and enter through the open gateways 29 to investigate the interior of the cage. As the gates 32 will yield to a slight pressure from the outside, the animals will enter through the same and in attempting to escape will be prevented by the closing of the gates behind them, as these gates cannot be opened from the inside of the cage. Other animals may then enter through other passages and be similarly caught in the trap. After a certain length of time the cage is emptied by opening the door 22 and fresh bait may be deposited in the bait chamber by opening the door 18.

In case sheet metal or wood is used in the construction of the cage instead of wire netting, a number of windows covered with mica or glass should be provided, so that the bait may be visible from the outside. As the passages 28 are directed centrally against the bait chamber 16, it will only be necessary to have a window at the inner end of a passage as at 39 in the wall of the bait chamber and at the end of the side passages 27 a small mirror might be placed at a suitable angle so that the bait in the bait chamber may be reflected in the longitudinal direction of the side passages 27 in order that it may be seen from the outside of the cage.

Around the passages 27 and 28 reinforcements 37 may be provided where the hinges are situated, to give sufficient strength to carry the gates.

When different kinds of animals are to be caught, different sizes of cages are constructed and of lighter or heavier material in accordance with the size of the animals to be trapped.

Having thus described the invention, what is claimed as new is:

1. An animal trap comprising a cage having transparent top and side walls, a closed chamber within said cage projecting through the top thereof and provided with an external roof, entrances being provided in the side walls of the cage, drums registering with said entrances and extending between said side walls and said closed chamber, said drums having individual tops and side walls, outlets being provided in the side walls of said drums, a gravity closing gate for each outlet adapted to open inwardly into the cage and suspended from the roof of each drum, and reinforcing frames for the gates on the roof and side walls of the drums.

2. An animal trap comprising a cage having transparent top and side walls, a closed chamber within said cage projecting through the top thereof and provided with an external roof, entrance openings being provided centrally in each of said side walls, drums registering with said entrances and extending between said side walls and said closed chamber, said drums having individual tops and side walls, outlets being provided in the side walls of said drums, other entrances being provided in the side walls of the cage, and drums registering with said other entrances and extending inwardly into the cage and having outlets at their inner ends, the drums for said other entrances being provided with individual top and side walls; a gravity closing gate in each of said drums adapted to open inwardly and suspended from the roof of each drum, and reinforcing frames for the gates on said roof and side walls of the drums.

3. An animal trap comprising a cage having transparent top and side walls, a closed chamber within said cage projecting through the top thereof and provided with an external roof, entrance openings being provided centrally in each of said side walls, drums registering with said entrances and extending between said side walls and said closed chamber, said drums having individual tops and side walls, outlets being provided in the side walls of said drums, other entrances being provided in the side walls of the cage, and drums registering with said other entrances and extending inwardly into the cage and having outlets at their inner ends, the drums for said other entrances being provided with individual top and side walls; a gravity closing gate in each of said drums adapted to open inwardly and suspended from the roof of each drum, reinforcing frames for the gates on said roof and side walls of the drums, and similar gates suspended across the side outlets of said first drums.

In testimony whereof I affix my signature.

CHARLES P. SOSBEE. [L. S.]